United States Patent
Holzheimer et al.

(10) Patent No.: US 11,306,829 B2
(45) Date of Patent: Apr. 19, 2022

(54) LOW TORQUE RESIDENTIAL WATER SHUTOFF VALVE

(71) Applicant: LEAKSMART INC., Bedford Hts., OH (US)

(72) Inventors: John C. Holzheimer, Chagrin Falls, OH (US); Keith Schneider, Bedford Hts., OH (US)

(73) Assignee: LeakSmart Inc., Bedford Hts., OH (US)

( * ) Notice: Subject to any disclaimer, the term of this patent is extended or adjusted under 35 U.S.C. 154(b) by 0 days.

(21) Appl. No.: 17/072,348

(22) Filed: Oct. 16, 2020

(65) Prior Publication Data

US 2021/0116038 A1  Apr. 22, 2021

Related U.S. Application Data

(60) Provisional application No. 62/916,261, filed on Oct. 17, 2019.

(51) Int. Cl.
*F16K 5/06* (2006.01)
*F16K 27/06* (2006.01)
*F16K 5/20* (2006.01)

(52) U.S. Cl.
CPC .......... *F16K 5/0647* (2013.01); *F16K 5/0605* (2013.01); *F16K 5/201* (2013.01); *F16K 5/204* (2013.01); *F16K 27/067* (2013.01)

(58) Field of Classification Search
CPC ........ F16K 5/0605; F16K 5/0647; F16K 5/20; F16K 5/201; F16K 5/204; F16K 5/205; F16K 27/067; F16K 31/041
See application file for complete search history.

(56) References Cited

U.S. PATENT DOCUMENTS

| | | | | |
|---|---|---|---|---|
| 1,040,327 A | * | 10/1912 | Hollis | F16K 5/0647 251/292 |
| 2,929,406 A | * | 3/1960 | Anderson | F16K 27/067 137/615 |
| 3,167,300 A | * | 1/1965 | Kaiser | 251/315.05 |
| 3,195,857 A | * | 7/1965 | Shafer | F16K 27/067 251/309 |
| 3,348,804 A | * | 10/1967 | Piccardo | F16K 27/067 251/214 |

(Continued)

OTHER PUBLICATIONS

"Homeguides" (Non-Patent Literature "How to Adjust the PSI on a Water Pressure Reducing Valve" by Chris Diezel at Homeguides, publicly available since Dec. 2018) (Year: 2018).*

*Primary Examiner* — David Colon-Morales
(74) *Attorney, Agent, or Firm* — Fay Sharpe LLP

(57) ABSTRACT

A low pressure, low operating force valve, for applications where automated valves are used, having reduced power requirements for an associated actuator. A low torque ball valve of a fixed ball valve configuration for low to medium pressure applications, such as for an electric motor actuated residential shutoff valve where pressures are typically below 100 psi, and commonly less than 60 psi, for example. The valve can be open or shut using a smaller electric motor than would be required for a conventional residential floating ball shutoff valve of a similar size. As such, the power requirements of the electric motor or other actuator are reduced allowing for the use of smaller motors, smaller power supplies and overall more efficient operation.

11 Claims, 2 Drawing Sheets

(56) References Cited

U.S. PATENT DOCUMENTS

| | | | | |
|---|---|---|---|---|
| 3,591,129 A * | 7/1971 | Hulsey | F16K 5/0605 | 251/118 |
| 3,624,803 A * | 11/1971 | Bryant | F16K 27/067 | 251/367 |
| 3,635,439 A * | 1/1972 | McNally | F16K 5/201 | 251/315.14 |
| 3,737,145 A * | 6/1973 | Heller | F16K 27/067 | 251/309 |
| 3,744,755 A * | 7/1973 | Gary, Jr | F16K 5/0626 | 251/309 |
| 3,765,645 A * | 10/1973 | Paul, Jr. | F16K 5/201 | 251/170 |
| 3,792,835 A * | 2/1974 | Shafer | F16K 27/107 | 251/309 |
| 3,826,281 A * | 7/1974 | Clark | F16K 27/067 | 137/625.31 |
| 4,467,823 A * | 8/1984 | Shaffer | F16K 5/0642 | 137/15.18 |
| 4,678,161 A * | 7/1987 | Bando | F16K 5/0626 | 251/171 |
| 5,127,628 A * | 7/1992 | Kemp | F16K 5/0647 | 251/304 |
| 5,386,967 A * | 2/1995 | Enniss | F16K 5/0647 | 251/315.04 |
| 5,553,831 A * | 9/1996 | Ozaki | F16K 5/0647 | 251/143 |
| 7,641,172 B2 * | 1/2010 | Richards | G01M 3/2807 | 251/129.04 |
| 7,798,170 B2 * | 9/2010 | Hotz | F16K 31/047 | 137/556.3 |
| 8,210,499 B2 * | 7/2012 | Madden | F16K 5/0647 | 251/315.01 |
| 8,511,640 B2 * | 8/2013 | Hiss | F16K 5/0647 | 251/214 |
| 9,581,268 B2 * | 2/2017 | Chen | F16K 5/0605 | |
| 10,295,387 B2 * | 5/2019 | Bonomi | F16K 27/067 | |
| 10,591,080 B2 * | 3/2020 | Halimi | F16K 31/055 | |
| 2001/0035510 A1 * | 11/2001 | Oh | F16K 31/535 | 251/129.03 |
| 2009/0165866 A1 * | 7/2009 | Fima | F16K 47/045 | 137/15.17 |
| 2015/0300509 A1 | 10/2015 | He | | |

\* cited by examiner

LOW TORQUE RESIDENTIAL WATER SHUTOFF VALVE

CROSS REFERENCE TO RELATED PATENTS AND APPLICATIONS

This application claims priority to and the benefit of the filing date of U.S. Provisional Patent Application Ser. No. 62/916,261, filed Oct. 17, 2019, which application is hereby incorporated by reference.

BACKGROUND

The present exemplary embodiment relates to shutoff valves. It finds particular application in conjunction with automated shutoff valves and will be described with particular reference thereto. However, it is to be appreciated that the present exemplary embodiment is also amenable to other like applications.

Ball valves have been used for controlling flow through pipes and other conduits for many years. Such valves include a ball supported in a valve body for rotation between open and closed positions. The ball includes a passageway that, when aligned with a flow passageway of the valve body, permits fluid to flow therethrough. When the ball is rotated such that its passageway is generally perpendicular to the flow passageway of the valve body, flow is prevented. The ball is typically driven by a valve stem that extends from the valve body. A handle is typically connected to the valve stem for manual rotation of the ball. In some cases, an electric motor or other actuator may be used to automate the valve.

Ball valves are generally simple devices that provide reliable flow control and do not require much, if any maintenance. The most basic type of ball valve is a floating ball valve wherein the ball is supported within the valve body for rotation but can move in the transverse and longitudinal directions within the valve body. Thus, the ball is free to displace within the valve body in the closed position when the pressure of the fluid on the upstream side of the ball acts thereon. This causes the ball to press against a valve seat of the valve body ensuring a tight seal. As the pressure of the fluid increases the ball is forced into greater sealing engagement with the valve seat. However, the torque required to open the valve also increases as the pressure of the fluid increases. In addition, the valve seat can be damaged if the fluid pressure becomes too great. Thus, the floating ball valve is generally used for lower pressure applications.

A more complex ball valve that is typically used for high pressure applications is a fixed ball valve, sometimes referred to as a trunnion ball valve. As compared to a floating ball valve, a ball of the fixed ball valve is fixed for rotation and fixed against transverse and longitudinal movement within the valve body by a pair of trunnions. In use, the ball does not displace in response to the fluid force applied to the ball. Instead the fluid force is transferred to a valve stem and/or the valve body. As a result, the valve seat does not experience increasing pressure with increasing fluid pressure. The fixed ball valve therefore generally requires a smaller operating torque and a longer service life. Fixed ball valves are more complex than floating ball valves and are generally used in higher pressure applications as well as larger scale applications.

While the floating ball valve has a simpler manufacturing process and a lower cost than a fixed ball valve, all fluid pressure bears on the valve seats. This in turn makes the drive force for opening and closing a floating ball valve relatively large.

BRIEF DESCRIPTION

A low pressure, low operating force valve, for applications where automated valves are used, having reduced power requirements for an associated actuator. The present disclosure sets forth a low torque ball valve for use in lower pressure applications. The ball valve is of a fixed ball valve configuration and is used in low to medium pressure applications, such as for an electric motor actuated residential shutoff valve where pressures are typically below 100 psi, and commonly less than 60 psi, for example. A valve in accordance with the present disclosure can be open or shut using a smaller electric motor than would be required for a conventional residential floating ball shutoff valve of a similar size. As such, the power requirements of the electric motor or other actuator are reduced allowing for the use of smaller motors, smaller power supplies and overall more efficient operation.

In accordance with one aspect, a valve comprises a valve body having an inlet and an outlet, a ball supported in the valve body for rotation between open and closed positions, the ball having a passageway for fluidly connecting the inlet of the valve body to the outlet of the valve body when in the open position, and a valve stem extending from the valve body, the valve stem coupled to the ball for rotating the ball between the open and closed positions. The ball is fixed for rotation about an axis perpendicular to a flow direction of the valve by at least one pin received in a bore of the valve stem.

A spring can be supported in the bore of the valve stem for biasing the at least one pin out of the bore of the valve stem. The at least one pin can be resilient. The valve can include an outlet valve seat against which the ball seals when in the closed position, wherein the at least one pin allows limited movement of the valve in a direction parallel to flow of fluid through the valve when the valve is in the closed position thereby increasing a sealing force apply to the valve seat by the ball. An electric motor can be connected to the valve stem for rotating the valve stem to move the ball between open and closed positions. The at least one pin can include a rigid metal core and a resilient material covering the rigid metal core. The electric motor can have a watt rating of less than 200 watts. The electric motor can operate on 6 volts DC. The valve can be a 1.5 inch or smaller valve for a residential water supply. The valve can include upper and lower pins for fixing the ball in the valve body for rotation and for limiting transverse movement relative to the valve body.

In accordance with another aspect, a method of controlling flow of fluid through a conduit is set forth, the fluid having a fluid pressure of less than 100 psi. The method comprises actuating a valve to permit or restrict flow of fluid through the conduit, wherein the valve includes: a valve body having an inlet and an outlet; a ball supported in the valve body for rotation between open and closed positions, the ball having a passageway for fluidly connecting the inlet of the valve body to the outlet of the valve body when in the open position; and a valve stem extending from the valve body, the valve stem coupled to the ball for rotating the ball between the open and closed positions.

The valve can include a motor operatively coupled to the valve stem and configured to apply torque to the valve stem, and wherein actuating the valve can include energizing the motor. The valve can further include a spring supported in the bore of the valve stem for biasing the at least one pin out of the bore of the valve stem. The at least one pin can be resilient.

DETAILED DESCRIPTION

Figure 1:
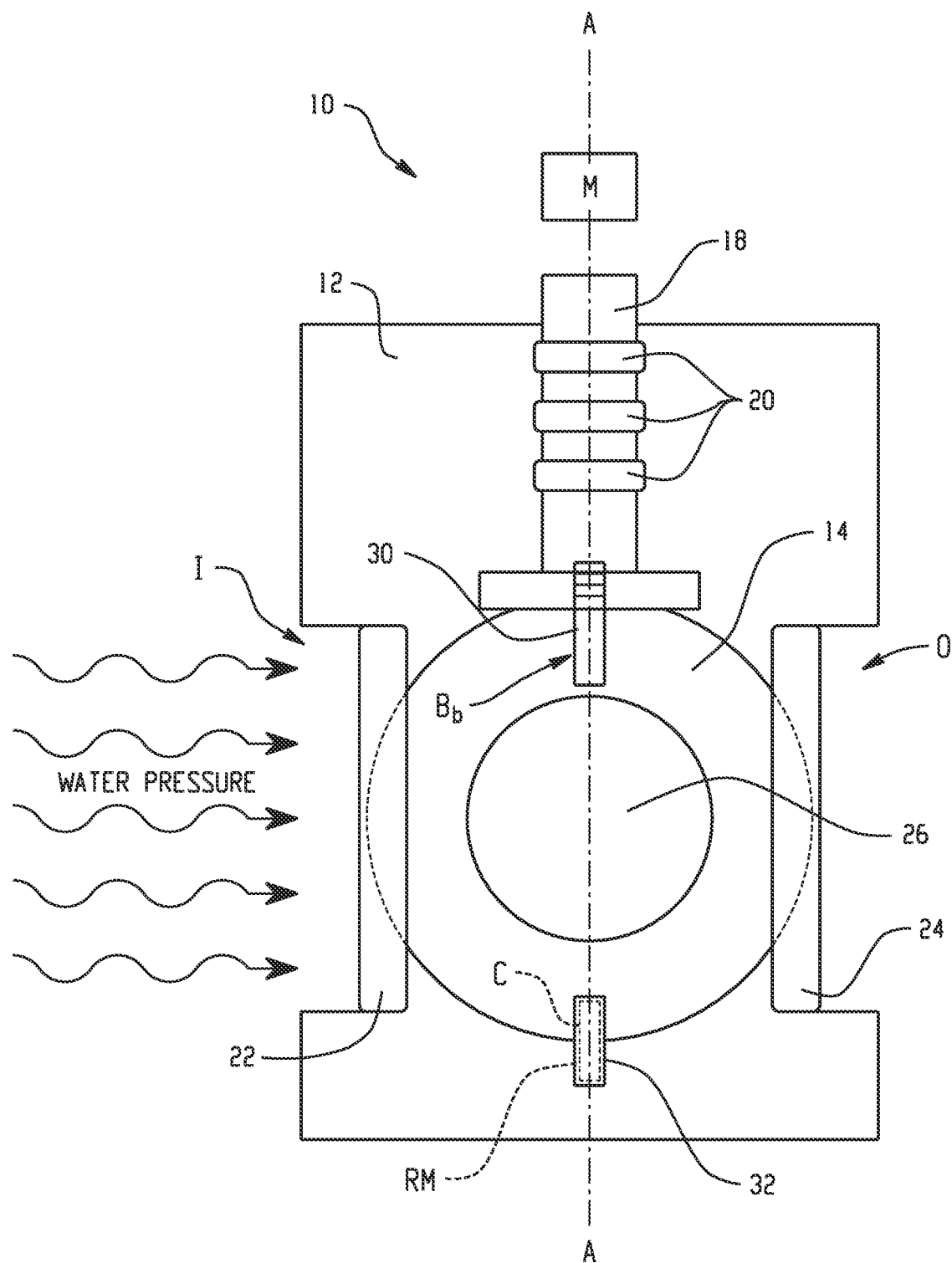
FIG. 1 is a side schematic view of certain components of a ball valve in accordance with the present disclosure.

With reference to FIG. 1, an exemplary valve in accordance with the present disclosure is shown and identified generally by reference numeral 10. It should be appreciated that the figures illustrate certain features of the present disclosure in the abstract, and a person of ordinary skill in the art would readily understand that the illustrated features can be embodied in a wide variety of valves. The valve 10 is a low-friction ball shutoff valve for use with an electric motor actuator for controlling flow of a municipal (or other) water supply, generally in a household setting where pressures do not typically exceed 100 psi, and more typically 60 psi. In certain embodiments, the ball valve 10 is a one-inch ball valve or smaller for residential applications.

The valve 10 includes a valve body 12 in which a ball 14 is supported for rotation to restrict or permit flow from a valve inlet I to a valve outlet O. A valve stem 18 connected (e.g., fixed for rotation) to the ball 14 extends from the valve body 12 for connection to an actuator, which in the illustrated embodiment is a motor M. Motor M can be a battery powered electric motor mounted to, adjacent, or integral with the valve body 12. The motor can be rated at less than 200 watts, for example. Suitable seals 20 on the valve stem 18 prevent leakage from the valve housing 12.

The ball 14 seals on opposite sides thereof against respective inlet and outlet valve seats 22 and 24 supported in the valve body 12. When in the closed position shown in FIG. 1, the ball 14 restricts flow through the valve body 12. When the ball 14 is rotated, a passageway 26 in the ball 14 is aligned with the inlet I and outlet O of the valve 10 to permit flow through the valve housing 12.

It will be appreciated that the water pressure acting on the ball 14 will apply force to the ball 14 towards the right in FIG. 1 when the valve is closed. If the ball 14 is not fixed within the valve housing 12, the water pressure increases the friction between the ball 14 and the outlet valve seat 24 thus requiring a larger force to open the valve 10 as water pressure rises.

In accordance with the present disclosure, the ball 14 is fixed within the valve body 12 for rotation and against limited transverse movement about a central axis A-A by upper and lower pins 30 and 32. The pins 30 and 32 prevent, restrict or otherwise limit the ball 14 from shifting along the flow direction of the valve body 12 when in the closed position which, in turn, prevents the fluid pressure from increasing the friction that must be overcome to open the valve 10.

During assembly, the lower pin 32 and ball 14 are located in the valve body 12 with the lower pin 32 received in a corresponding bore of the valve body 14. The upper pin 30 is supported in a corresponding bore Bvs of the valve stem 18 and is biased by a spring 44 (see FIG. 2) so as to engage in a corresponding bore Bb in the ball 14 when the valve stem 18 is installed from the top of the valve body 12.

Figure 2:
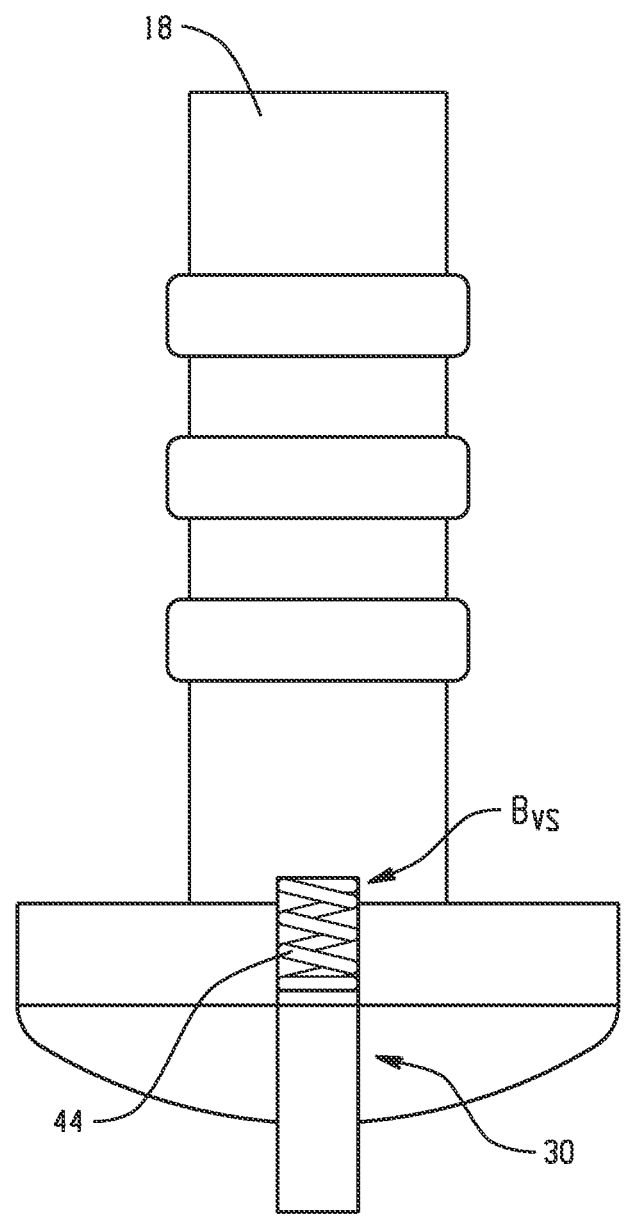
FIG. 2 is a side schematic view of a valve stem in accordance with the present disclosure.

In some embodiments, the pins 30 and 32 can be resilient or can include resilient portions thereof that allow a limited amount of displacement of the ball 14 in the valve body when under pressure. In such embodiments, the ball 14 would act as a floating ball to enhance low pressure sealing, and act as a fixed ball at higher pressures to reduce opening torque requirements. In FIG. 1, the pins 32 include a metal core C overmolded with a resilient material RM (e.g., an elastomer or the like) that can be compressed to allow a certain amount of displacement of the ball 14 within the valve body 12. In FIG. 2, the pin 32 is shown as a being made of a resilient material, such as plastic, rubber, or the like.

It will be appreciated that aspects of the present disclosure provide a low torque, low/medium pressure ball valve that can be actuated by low power actuators, such as a battery-powered electric motor operating on a 6 v power supply.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A valve comprising:
a valve body having an inlet and an outlet;
a ball supported in the valve body for rotation between open and closed positions, the ball having a passageway for fluidly connecting the inlet of the valve body to the outlet of the valve body when in the open position; and
a valve stem extending from the valve body, the valve stem coupled to the ball for rotating the ball between the open and closed positions;
wherein the ball is fixed for rotation about an axis perpendicular to a flow direction of the valve by at least one resilient pin received in a bore of the valve stem; and
an outlet valve seat against which the ball seals when in the closed position, wherein the at least one resilient pin allows limited movement of the valve in a direction parallel to flow of fluid through the valve when the valve is in the closed position thereby increasing a sealing force applied to the valve seat by the ball.

2. The valve of claim 1, wherein an electric motor is connected to the valve stem for rotating the valve stem to move the ball between open and closed positions.

3. The valve of claim 2, wherein the at least one pin includes a rigid metal core and a resilient material covering the rigid metal core.

4. The valve of claim 3, wherein the electric motor has a watt rating at less than 200 watts.

5. The valve of claim 4, wherein the electric motor operates on 6 volts DC.

6. The valve of claim 5, wherein the valve is a 1.5 inch or smaller valve for a residential water supply.

7. The valve of claim 6, further comprising a lower pin for fixing the ball in the valve body for rotation and for limiting transverse movement relative to the valve body, the lower pin axially aligned with the upper pin and extending from an opposite side of the ball.

8. A valve comprising:
a valve body having an inlet and an outlet;
a ball supported in the valve body for rotation between open and closed positions, the ball having a passageway for fluidly connecting the inlet of the valve body to the outlet of the valve body when in the open position; and a valve stem extending from the valve body, the valve stem coupled to the ball for rotating the ball between the open and closed positions;

wherein the ball is fixed for rotation about an axis perpendicular to a flow direction of the valve by at least one pin received in a bore of the valve stem; and a spring supported in the bore of the valve stem for biasing the at least one pin out of the bore of the valve stem.

9. A method of controlling flow of fluid through a conduit, the fluid having a fluid pressure of less than 60 psi, the method comprising:

actuating a valve to permit or restrict flow of fluid through the conduit, wherein the valve includes:

a valve body having an inlet and an outlet;

a ball supported in the valve body for rotation between open and closed positions, the ball having a passageway for fluidly connecting the inlet of the valve body to the outlet of the valve body when in the open position; and a valve stem extending from the valve body, the valve stem coupled to the ball for rotating the ball between the open and closed positions;

wherein the valve includes a spring supported in a bore of the valve stem for biasing at least one pin out of the bore of the valve stem.

10. The method of claim 9, wherein the valve includes a motor operatively coupled to the valve stem and configured to apply torque to the valve stem, and wherein actuating the valve includes energizing the motor.

11. The method of claim 9 wherein the at least one pin is resilient.

* * * * *